US012770611B2

(12) United States Patent
Wang et al.

(10) Patent No.: US 12,770,611 B2
(45) Date of Patent: Oct. 20, 2026

(54) VOICE DIALOG PROCESSING METHOD AND APPARATUS BASED ON MULTI-MODAL FEATURE, AND ELECTRONIC DEVICE

(71) Applicant: JINGDONG TECHNOLOGY INFORMATION TECHNOLOGY CO., LTD., Beijing (CN)

(72) Inventors: Peiying Wang, Beijing (CN); Jiudong Yang, Beijing (CN); Meng Chen, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 190 days.

(21) Appl. No.: 18/708,772

(22) PCT Filed: Aug. 19, 2022

(86) PCT No.: PCT/CN2022/113640
§ 371 (c)(1),
(2) Date: May 9, 2024

(87) PCT Pub. No.: WO2023/082752
PCT Pub. Date: May 19, 2023

(65) Prior Publication Data

US 2025/0006180 A1 Jan. 2, 2025

(30) Foreign Application Priority Data

Nov. 9, 2021 (CN) ......................... 202111337746.8

(51) Int. Cl.
*G10L 15/02* (2006.01)
*G10L 15/18* (2013.01)
*G10L 15/22* (2006.01)

(52) U.S. Cl.
CPC .......... *G10L 15/02* (2013.01); *G10L 15/1822* (2013.01); *G10L 15/22* (2013.01); *G10L 2015/025* (2013.01)

(58) Field of Classification Search
CPC ............... G10L 15/22; G10L 2015/088; G10L 2015/223; G10L 15/02; G10L 15/1822;
(Continued)

(56) References Cited

U.S. PATENT DOCUMENTS 9,697,822 B1 * 7/2017 Naik ........................ G10L 15/22
10,199,051 B2 * 2/2019 Binder .................... G10L 17/24
(Continued)

FOREIGN PATENT DOCUMENTS

CN 111105782 A 5/2020
CN 112101045 A 12/2020
(Continued)

OTHER PUBLICATIONS

Japanese Patent Office Action for Application No. 2024523243 dated Jun. 10, 2025 (7 pages including English machine translation).
(Continued)

*Primary Examiner* — Vijay B Chawan
(74) *Attorney, Agent, or Firm* — Michael Best & Friedrich LLP

(57) ABSTRACT

A voice dialogue processing method and apparatus (300) based on a multi-modal feature, and an electronic device. The method comprises: acquiring, in the process of performing dialogue interaction with a user, first voice information that the user currently inputs, wherein the first voice information comprises a silent segment (101); determining, according to text information of the first voice information and historical context information of the first voice information, semantic feature information of the text information (102); determining, according to a voice fragment, which is
(Continued)

before the silent segment, in the first voice information, phonetic feature information of the first voice information (103); acquiring temporal feature information of the first voice information (104); and determining, according to the semantic feature information, the phonetic feature information and the temporal feature information, whether the user ends voice input (105).

13 Claims, 3 Drawing Sheets

(58) Field of Classification Search
CPC ......... G10L 15/26; G10L 15/08; G10L 15/30; G10L 25/78; G10L 25/84; G10L 15/04; G10L 15/183; G10L 21/0208; G10L 2015/025
USPC .......................................................... 704/246
See application file for complete search history.

(56) References Cited

U.S. PATENT DOCUMENTS

| | | | | |
|---|---|---|---|---|
| 10,978,090 | B2 * | 4/2021 | Binder | G06F 1/1694 |
| 11,972,095 | B2 * | 4/2024 | Klein | G06F 3/167 |
| 12,430,011 | B2 * | 9/2025 | Klein | G06F 3/167 |
| 2018/0113854 | A1 * | 4/2018 | Vig | H04M 3/51 |
| 2020/0042595 | A1 | 2/2020 | Brunn et al. | |
| 2022/0093101 | A1 * | 3/2022 | Krishnan | G06V 40/20 |
| 2022/0308718 | A1 * | 9/2022 | Klein | G10L 15/08 |
| 2024/0241624 | A1 * | 7/2024 | Klein | G06F 3/0484 |
| 2025/0006180 | A1 * | 1/2025 | Wang | G10L 15/26 |

FOREIGN PATENT DOCUMENTS

| | | | |
|---|---|---|---|
| CN | 112825248 | A | 5/2021 |
| CN | 113035180 | A | 6/2021 |
| CN | 113160854 | A | 7/2021 |
| CN | 114078474 | A | 2/2022 |
| JP | 2021503625 | A | 2/2021 |
| JP | 2021051172 | A | 4/2021 |

OTHER PUBLICATIONS

International Patent Office Search Report for Application No. PCT/CN2022/113640 dated Nov. 17, 2022 (6 pages including English translation).

* cited by examiner

VOICE DIALOG PROCESSING METHOD AND APPARATUS BASED ON MULTI-MODAL FEATURE, AND ELECTRONIC DEVICE

CROSS-REFERENCE TO RELATED APPLICATION(S)

This is a U.S. national stage entry of International Patent Application No. PCT/CN2022/113640, filed on Aug. 19, 2022, which claims priority to Chinese Patent application Ser. No. 202111337746.8, filed on Nov. 9, 2021, the entire contents of each of which are fully incorporated herein by reference.

TECHNICAL FIELD

The present invention relates to the field of computer technology, in particular to a voice dialogue processing method and apparatus based on a multi-modal feature, and an electronic device.

BACKGROUND ART

In a voice dialogue system, when a user speaks, the voice dialogue system needs to judge to take over the right to speak at the right time. That is, the voice dialogue system switches back and forth between the roles of listener and speaker, making human-computer interaction smooth and natural.

At present, most voice dialogue systems adopt a manner of identifying the user's silence duration by voice activity detection (VAD). When the user's silence duration exceeds a threshold (such as 0.8 s to 1 s), the system takes over the right to speak. However, in the manner of fixing the silence duration, if the user has not finished speaking and is thinking, but the silence duration exceeds the threshold, the system's response will be too rapid and sensitive: if the user's interaction is quick and concise, then the system still waits for the silence duration to reach the set threshold before taking over the right to speak, resulting in a slow response of the system and possibly causing the user to answer repeatedly. Therefore, how to determine when the voice dialogue system takes over the right to speak is an urgent issue that needs to be addressed currently.

SUMMARY OF THE INVENTION

The present application proposes a voice dialogue processing method and apparatus based on a multi-modal feature, and an electronic device.

An embodiment in one aspect of the present application proposes a voice dialogue processing method based on a multi-modal feature, comprising: acquiring, in the process of performing dialogue interaction with a user, first voice information that the user currently inputs, wherein the first voice information comprises a silent segment; determining, according to text information of the first voice information and historical context information of the first voice information, semantic feature information of the text information: determining, according to a voice fragment, which is before the silent segment, in the first voice information, phonetic feature information of the first voice information: acquiring temporal feature information of the first voice information; and determining, according to the semantic feature information, the phonetic feature information and the temporal feature information, whether the user ends voice input.

In one embodiment of the present application, the determining, according to text information of the first voice information and historical context information of the first voice information, semantic feature information of the text information comprises: performing voice recognition on the first voice information to obtain text information of the first voice information; acquiring historical context information of the first voice information; and inputting the text information and the historical context information into a semantic representation model to obtain semantic feature information of the text information.

In one embodiment of the present application, the determining, according to a voice fragment, which is before the silent segment, in the first voice information, phonetic feature information of the first voice information comprises: acquiring a voice fragment of a first preset time length, which is before the silent segment, in the first voice information: segmenting, according to a second preset time length, the voice fragment to obtain multiple voice fragments: extracting respective acoustic feature information of the multiple voice fragments, and splicing the respective acoustic feature information of the multiple voice fragments, respectively, to obtain respective splicing features of the multiple voice fragments; and inputting the splicing features into a deep residual network to obtain phonetic feature information of the first voice information.

In one embodiment of the present application, the acquiring temporal feature information of the first voice information comprises: acquiring a voice duration, a speaking speed and a text length of the first voice information; and inputting the voice duration, the speaking speed and the text length into a pre-trained multi-layer perceptron MLP model to obtain temporal feature information of the first voice information.

In one embodiment of the present application, the determining, according to the semantic feature information, the phonetic feature information and the temporal feature information, whether the user ends voice input comprises: inputting the semantic feature information, the phonetic feature information and the temporal feature information into a multi-modal fusion model; and determining, according to an output result of the multi-modal fusion model, whether the user ends voice input.

In one embodiment of the present application, there is further comprised: determining, in the case of determining that the user ends the voice input, first reply voice information corresponding to the first voice information, and outputting the first reply voice information.

In one embodiment of the present application, there are further comprised: acquiring, in the case of determining that the user does not end the voice input, second voice information input again by the user; and determining, according to the first voice information and the second voice information, corresponding second reply voice information, and outputting the second reply voice information.

An embodiment in another aspect of the present application proposes a voice dialogue processing apparatus based on a multi-modal feature, comprising: a first acquisition module for acquiring, in the process of performing dialogue interaction with a user, first voice information that the user currently inputs, wherein the first voice information comprises a silent segment: a first determination module for determining, according to text information of the first voice information and historical context information of the first voice information, semantic feature information of the text information: a second determination module for determining, according to a voice fragment, which is before the silent segment, in the first voice information, phonetic feature information of the first voice information: a second acquisition module for acquiring temporal feature information of the first voice information; and a third determination module for determining, according to the semantic feature information, the phonetic feature information and the temporal feature information, whether the user ends voice input.

In one embodiment of the present application, the first determination module is specifically used for: performing voice recognition on the first voice information to obtain text information of the first voice information: acquiring historical context information of the first voice information; and inputting the text information and the historical context information into a semantic representation model to obtain semantic feature information of the text information.

In one embodiment of the present application, the second determination module is specifically used for: acquiring a voice fragment of a first preset time length, which is before the silent segment, in the first voice information: segmenting, according to a second preset time length, the voice fragment to obtain multiple voice fragments; extracting respective acoustic feature information of the multiple voice fragments, and splicing the respective acoustic feature information of the multiple voice fragments, respectively, to obtain respective splicing features of the multiple voice fragments; and inputting the splicing features into a deep residual network to obtain phonetic feature information of the first voice information.

In one embodiment of the present application, the second acquisition module is specifically used for: acquiring a voice duration, a speaking speed and a text length of the first voice information; and inputting the voice duration, the speaking speed and the text length into a pre-trained multi-layer perceptron MLP model to obtain temporal feature information of the first voice information.

In one embodiment of the present application, the third determination module comprises: a multi-modal processing unit for inputting the semantic feature information, the phonetic feature information and the temporal feature information into a multi-modal fusion model; and a determination unit for determining, according to an output result of the multi-modal fusion model, whether the user ends voice input.

In one embodiment of the present application, there is further comprised: a first processing module for determining, in the case of determining that the user ends the voice input, first reply voice information corresponding to the first voice information, and outputting the first reply voice information.

In one embodiment of the present application, there are further comprised: a third acquisition module for acquiring, in the case of determining that the user does not end the voice input, second voice information input again by the user; and a second processing module for determining, according to the first voice information and the second voice information, corresponding second reply voice information, and outputting the second reply voice information.

An embodiment in another aspect of the present application proposes an electronic device, comprising: a memory, and a processor, wherein the memory stores computer instructions that, when executed by the processor, implement the voice dialogue processing method based on a multi-modal feature according to the embodiment of the present application.

An embodiment in another aspect of the present application proposes a non-transitory computer-readable storage medium storing computer instructions, wherein the computer instructions are used to cause the computer to perform the voice dialogue processing method based on a multi-modal feature as disclosed in the embodiment of the present application.

An embodiment in another aspect of the present application proposes a computer program product, wherein instructions in the computer program product, when executed by a processor, implement the voice dialogue processing method based on a multi-modal feature in the embodiment of the present application.

The other effects of the above-mentioned optional modes will be described below in conjunction with specific embodiments.

BRIEF DESCRIPTION OF THE DRAWINGS

The figures are used for a better understanding of the present solution, and do not constitute limitations to the present application, wherein.

DETAILED DESCRIPTION OF THE EMBODIMENTS

Embodiments of the present disclosure are described in detail below, examples of which are illustrated in the figures, in which the same or similar reference signs throughout represent the same or similar elements or elements having the same or similar functions. The embodiments described below with reference to the figures are exemplary and are intended to explain the present application, but cannot be construed as limiting the present application.

The voice dialogue processing method and apparatus based on a multi-modal feature, and the electronic device according to the embodiments of the present application are described below with reference to the figures.

Figure 1:
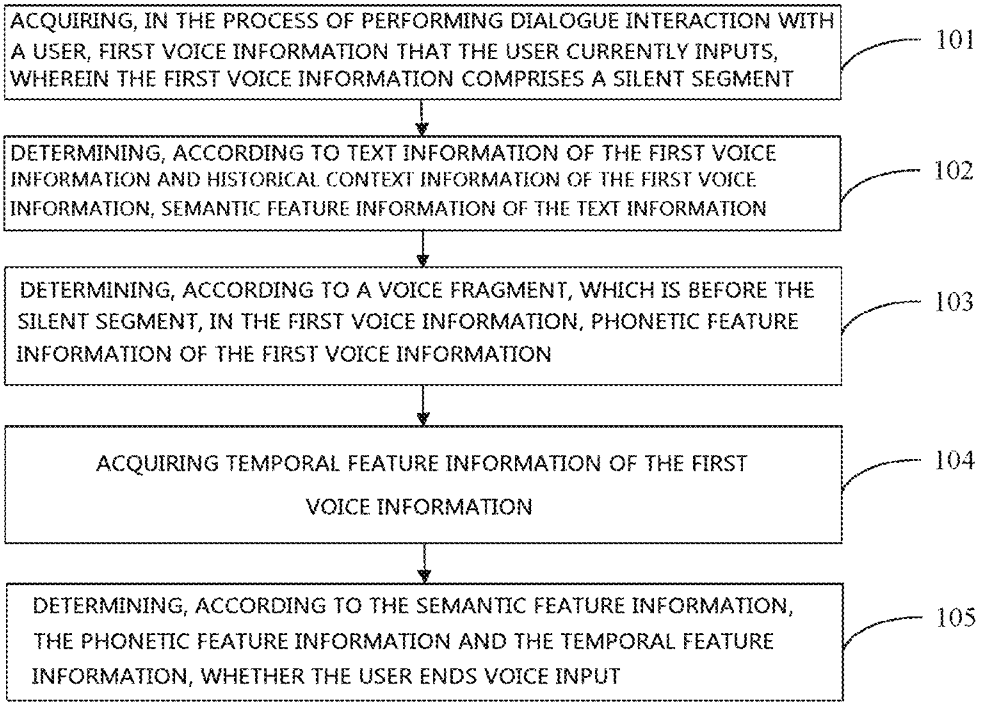
FIG. 1 is a schematic flowchart of a voice dialogue processing method based on a multi-modal feature according to an embodiment of the present application.

FIG. 1 is a schematic flowchart of a voice dialogue processing method based on a multi-modal feature according to an embodiment of the present application. Herein, it should be noted that the execution subject of the voice dialogue processing method based on a multi-modal feature as provided by the embodiment of the present application is a voice dialogue processing apparatus based on a multi-modal feature, which can be implemented by software and/or hardware. In a voice dialogue system of the voice dialogue processing apparatus based on a multi-modal feature in the embodiment of the present application, the voice dialogue system can be configured in an electronic device. The electronic device may comprise a terminal device, a server or the like.

As shown in FIG. 1, the voice dialogue processing method based on a multi-modal feature may comprise step 101 to step 105.

Step 101: acquiring, in the process of performing dialogue interaction with a user, first voice information that the user currently inputs, wherein the first voice information comprises a silent segment.

Step 102: determining, according to text information of the first voice information and historical context information of the first voice information, semantic feature information of the text information.

In one embodiment of the present application, voice recognition can be performed on the first voice information to obtain text information of the first voice information, historical context information of the first voice information can be acquired, and the text information and the historical context information can be input into a semantic representation model to obtain semantic feature information of the text information.

In some embodiments, in order to capture a long-distance dependency between the text information and the historical context information and accurately determine the semantic feature information of the text information based on the long-distance dependency, the above semantic representation model may be a Transformer model based on a self-attention mechanism.

In some embodiments, the Transformer model may include multiple coding layers. Each coding layer includes a Transformer-based coding structure, and the corresponding coding structure encodes input content and inputs an output result to the corresponding next coding layer for processing.

In some embodiments, an exemplary embodiment for acquiring the historical context information of the first voice information is as follows: multiple pieces of historical voice dialogue information before the first voice information can be acquired, and the historical context information of the first voice information can be acquired based on the multiple pieces of historical voice dialogue information.

Step 103: determining, according to a voice fragment, which is before the silent segment, in the first voice information, phonetic feature information of the first voice information.

In some embodiments, a voice fragment of a first preset time length, which is before the silent segment, in the first voice information can be acquired; the voice fragment can be segmented, according to a second preset time length, to obtain multiple voice fragments: respective acoustic feature information of the multiple voice fragments can be extracted, and can be spliced, respectively, to obtain respective splicing features of the multiple voice fragments; and the splicing features can be input into a deep residual network to obtain phonetic feature information of the first voice information.

In some embodiments, the first preset time length is set in advance. For example, the above-mentioned first preset time length may be 2 seconds. That is to say, a voice segment with a duration of 2 seconds before the silent segment in the first voice information can be intercepted.

In some embodiments, the second preset time length is set in advance, and the first preset time length is greater than the second preset time length. For example, the first preset time length is 2 seconds, and the above-mentioned second preset time length may be 50 milliseconds (ms). In some embodiments, after acquiring a 2-second-long voice segment, the voice segment can be segmented by 50 ms to obtain multiple voice segments, wherein each voice segment is 50 ms long.

In some embodiments, the acoustic feature information may include, but is not limited to, energy, volume, pitch, zero-crossing rate, etc.

Step 104: acquiring temporal feature information of the first voice information.

In some embodiments, a voice duration, a speaking speed and a text length of the first voice information can be acquired, and the voice duration, the speaking speed and the text length can be input into a pre-trained Multi-Layer Perceptron (MLP) model to obtain temporal feature information of the first voice information.

In some embodiments, the text length can be determined based on the text information corresponding to the first voice information.

Step 105: determining, according to the semantic feature information, the phonetic feature information and the temporal feature information, whether the user ends voice input.

In some embodiments, in order to accurately determine whether the user ends voice input, the semantic feature information, the phonetic feature information and the temporal feature information can be input into a multi-modal fusion model, and whether the user ends voice input can be determined according to an output result of the multi-modal fusion model.

In some embodiments, after acquiring the semantic feature information, phonetic feature information and temporal feature information, the multi-modal fusion model can acquire respective weights of the above-mentioned semantic feature information, phonetic feature information and temporal feature information, perform weighted processing on the semantic feature information, phonetic feature information and temporal feature information based on the weights, and input a weighted result into an activation function of the multi-modal fusion model, to obtain an output result of the multi-modal fusion model.

In some embodiments, when the output result of the multi-modal fusion model indicates that the user ends the voice input, it can be determined that the user ends the voice input. At this time, it can be determined that the dialogue system can take over the right to speak. In some other embodiments, when the output result of the multi-modal fusion model indicates that the user does not end the voice input, it can be determined that the user does not end the voice input. At this time, the dialogue system can continue to listen and reply after determining that the user input is ended.

The voice dialogue processing method based on a multi-modal feature according to an embodiment of the present application comprises: determining, in the process of performing dialogue interaction with a user, by combining text information of voice information currently input by the user and historical context information of the first voice information, semantic feature information of the text information: determining, according to a voice fragment, which is before the silent segment, in the first voice information, phonetic feature information of the first voice information: acquiring temporal feature information of the first voice information; and determining, according to the semantic feature information, the phonetic feature information and the temporal feature information, whether the user ends voice input. Therefore, in the process of performing dialogue interaction with the user, the semantic feature information, phonetic feature information and temporal feature information are combined to accurately determine whether the system can take over the right to speak.

Based on the above embodiments, in order to enable the dialogue system to accurately reply to the voice information input by the user, in some embodiments, when it is determined that the user ends the voice input, first reply voice information corresponding to the first voice information is determined and output.

In some other embodiments, when it is determined that the user does not end the voice input, second voice information input again by the user is acquired; and corresponding second reply voice information is determined, according to the first voice information and the second voice information, and output. Thus, an accurate reply is made by combining the first voice information currently input by the user and the second voice information input again thereby.

In order to enable those skilled in the art to understand the present application clearly, the method according to the embodiment of the present application is further described below with reference to FIG. 2.

Figure 2:
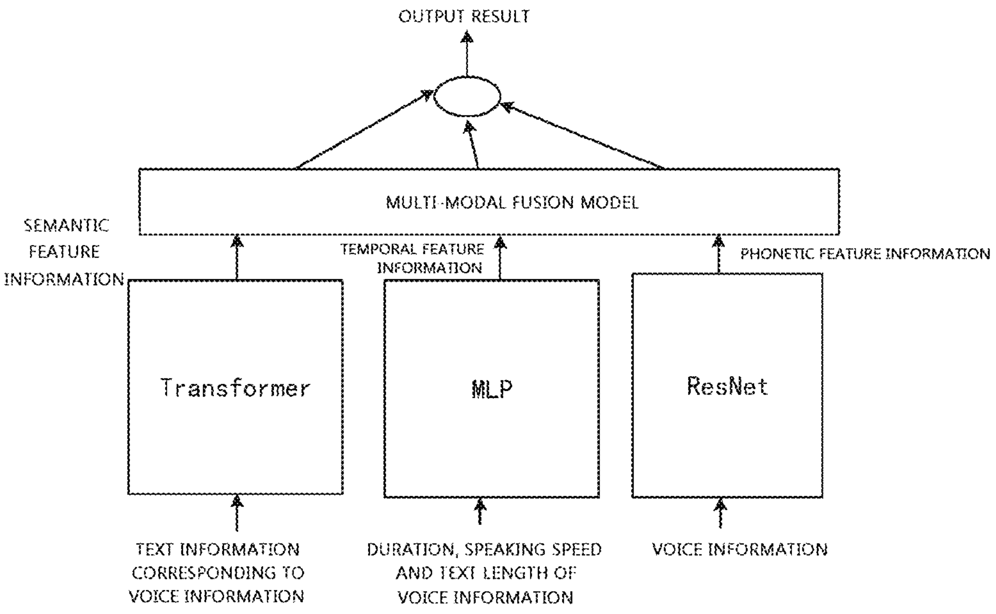
FIG. 2 is an example diagram describing a voice dialogue processing method in combination with a model framework diagram according to a specific embodiment of the present application.

As can be seen from FIG. 2, in the process of determining whether the user ends the voice input, the embodiment of the present application uses features in three different dimensions, i.e., the phonetic feature information, semantic feature information and temporal feature information, to determine whether the user ends the voice input. That is, the embodiment of the present application uses the features in three different dimensions, i.e., the semantic feature information, phonetic feature information and temporal feature information, to determine whether the dialogue system can take over the right to speak, i.e., determining whether the dialogue system outputs a corresponding reply.

The processes of acquiring semantic feature information, phonetic feature information and temporal feature information are described below respectively.

1) Acquiring Semantic Feature Information

Herein, the semantic feature information comes from text information after voice recognition, and its importance for decision-making of the right to speak is self-evident, especially considering that "semantic integrity" is a basic element for switching the right to speak. In other words, after determining that the user has fully expressed his/her intention, it often means that the system can take over the right to speak. Moreover, the semantic integrity is generally judged based on the context, such as the following simple example:

| Completed | Uncompleted |
|---|---|
| Sys: Can I deliver the goods to you the day after tomorrow?<br>User: Yes | Sys: Can I deliver the goods to you the day after tomorrow?<br>User: Er . . . |

In the example on the left, the user gives a definite reply with clear semantics. At this time, the dialogue system can take over the right to speak. In the example on the right, the user hesitates briefly, but it can be determined, based on the content currently entered by the user, that the user has not finished speaking. At this time, the dialogue system can choose to continue listening and wait for the user to finish speaking.

In order to model this semantic integrity, during dialogue interaction between the user and the dialogue system, after acquiring the voice information currently input by the user, voice recognition can be performed on the voice information to obtain current text information, and the historical context information of the currently input voice information and the current text information can be encoded to obtain semantic feature information of the text information.

In some embodiments, a Transformer model based on a self-attention mechanism can be used to encode the historical context information of the currently input voice information and the text information corresponding to the current text information.

Herein, it is understandable that the self-attention mechanism in the Transformer model can capture a long-distance dependency between the historical context information and the text information. The final semantic features are expressed as:

$$r^s = \text{Transformer}(e)$$

2) Acquiring Phonetic Feature Information

It is understandable that, during the dialogue, some voice features, such as changes in pitch, volume, etc., are all important clues for judging whether to switch the right to speak. Therefore, during the dialogue with the user, after acquiring the voice information currently input by the user, a piece of audio (2s) before the user is silent can be intercepted from the voice information and then divided into small segments of a fixed length, i.e., framed (50 ms per frame). Next, the corresponding acoustic features of each frame of audio, such as energy, volume, pitch, zero-crossing rate, etc., are extracted and spliced into a one-dimensional vector to obtain a feature representation f_i of each frame of audio. Finally, the features F=[f1, f2 . . . fn] of the sequence frame can be input into a multi-layer deep Residual Network (ResNet) to obtain a final voice feature representation:

$$r^a = ResNet(F)$$

3) Temporal Features

What needs to be understood is that temporal features (such as the duration, speaking speed, text length, etc. of the voice segment) also play a certain role in judging whether the right to speak is switched or not. For example, in a system-led outbound call dialogue scenario, in most cases, the system can take over the right to speak after the user makes a brief reply, while, in most cases where the system is required to listen, a longer reply is generated due to factors such as the user's hesitation. Therefore, in order to accurately determine whether the dialogue system can take over the right to speak, in the process of performing dialogue interaction with the user, the voice duration, speaking speed and text length of the voice information currently input by the user can be acquired and can be bucketed respectively, and the processed voice duration, speaking speed and text length can be input into the MLP model to obtain low-dimensional temporal feature information of the voice information.

Herein, its low-dimensional feature representation is extracted through a multi-layer perceptual network:

$$r^t = MLP(t)$$

4) Fusion of Multi-Modal Features

In some embodiments, after acquiring the feature representation of each modality, three different features are fused, by inputting it into a multi-modal fusion model, to determine the right to speak:

$$y=\sigma(W_s r^s + W_a r^a + W_t r^t + b)$$

wherein σ(·) refers to a sigmoid function, y is a predicted binary label: 1—indicates that the user has finished speaking and the system takes over the right to speak: 0—indicates that the system should continue to listen to the user's reply; and b represents an offset value.

In some embodiments, the above-mentioned multi-modal fusion model can be established based on a feed-forward neural network.

Corresponding to the voice dialogue processing methods based on a multi-modal feature as provided by the above-mentioned several embodiments, an embodiment of the present application also provides a voice dialogue processing apparatus based on a multi-modal feature. Since the voice dialogue processing apparatus based on a multi-modal feature as provided by the embodiment of the present application corresponds to the voice dialogue processing methods based on a multi-modal feature as provided by the above-mentioned several embodiments, the implementation mode for the voice dialogue processing methods based on a multi-modal feature is also applicable to the voice dialogue processing apparatus based on a multi-modal feature provided as provided by the embodiment of the present application.

Figure 3:
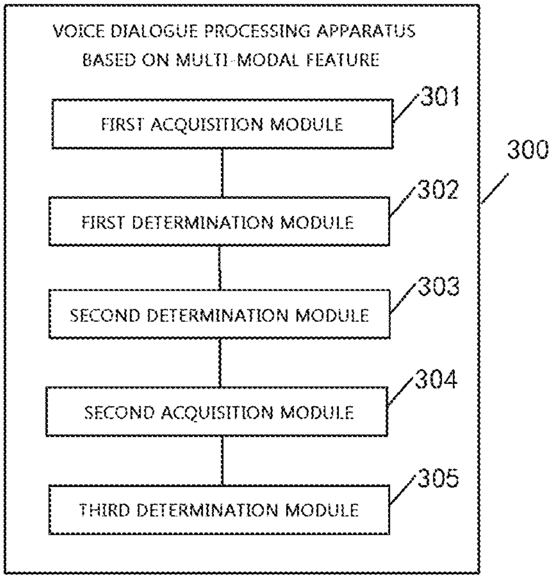
FIG. 3 is a structural schematic diagram of a voice dialogue processing apparatus based on a multi-modal feature according to an embodiment of the present application.

FIG. 3 is a structural schematic diagram of a voice dialogue processing apparatus based on a multi-modal feature according to an embodiment of the present application.

As shown in FIG. 3, the voice dialogue processing apparatus 300 based on a multi-modal feature comprises a first acquisition module 301, a first determination module 302, a second determination module 303, a second acquisition module 304 and a third determination module 305.

The first acquisition module 301 is used for acquiring, in the process of performing dialogue interaction with a user, first voice information that the user currently inputs, wherein the first voice information comprises a silent segment.

The first determination module 302 is used for determining, according to text information of the first voice information and historical context information of the first voice information, semantic feature information of the text information.

The second determination module 303 is used for determining, according to a voice fragment, which is before the silent segment, in the first voice information, phonetic feature information of the first voice information.

The second acquisition module 304 is used for acquiring temporal feature information of the first voice information.

The third determination module 305 is used for determining, according to the semantic feature information, the phonetic feature information and the temporal feature information, whether the user ends voice input.

In one embodiment of the present application, the first determination module 302 is specifically used for: performing voice recognition on the first voice information to obtain text information of the first voice information: acquiring historical context information of the first voice information; and inputting the text information and the historical context information into a semantic representation model to obtain semantic feature information of the text information.

In one embodiment of the present application, the second determination module 303 is specifically used for: acquiring a voice fragment of a first preset time length, which is before the silent segment, in the first voice information: segmenting, according to a second preset time length, the voice fragment to obtain multiple voice fragments; extracting respective acoustic feature information of the multiple voice fragments, and splicing the respective acoustic feature information of the multiple voice fragments, respectively, to obtain respective splicing features of the multiple voice fragments; and inputting the splicing features into a deep residual network to obtain phonetic feature information of the first voice information.

In one embodiment of the present application, the above-mentioned second acquisition module 304 is specifically used for: acquiring a voice duration, a speaking speed and a text length of the first voice information; and inputting the voice duration, the speaking speed and the text length into a pre-trained multi-layer perceptron MLP model to obtain temporal feature information of the first voice information.

Figure 4:
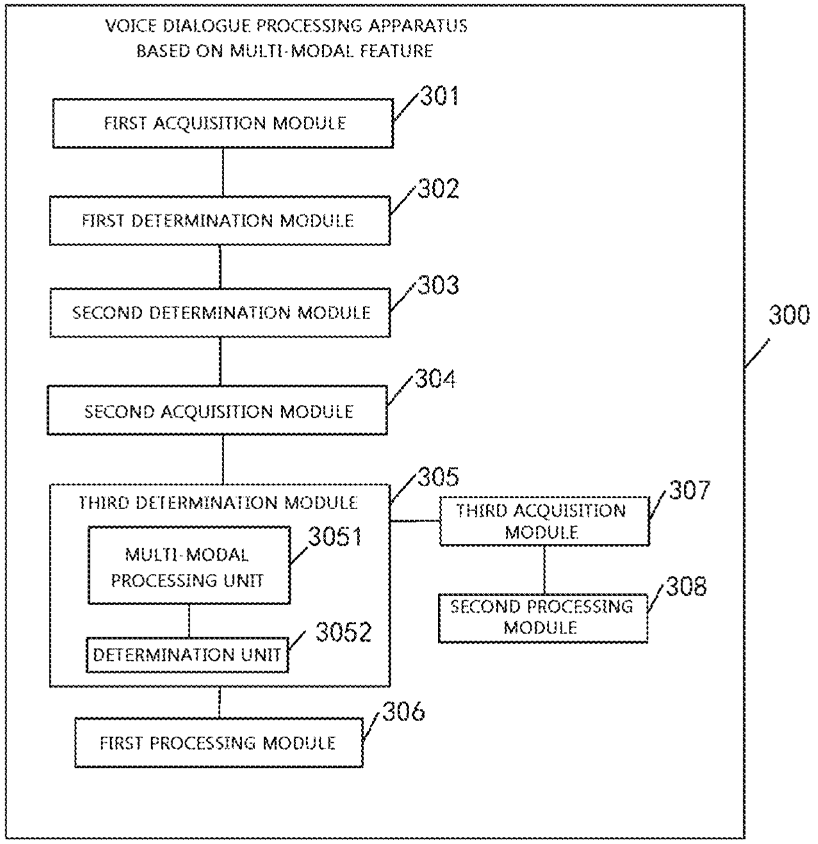
FIG. 4 is a structural schematic diagram of a voice dialogue processing apparatus based on a multi-modal feature according to another embodiment of the present application.

In one embodiment of the present application, based on the apparatus embodiment shown in FIG. 3, as shown in FIG. 4, the above-mentioned third determination module 305 may include a multi-modal processing unit 3051 and a determination unit 3052.

The multi-modal processing unit 3051 is used for inputting the semantic feature information, the phonetic feature information and the temporal feature information into a multi-modal fusion model.

The determination unit 3052 is used for determining, according to an output result of the multi-modal fusion model, whether the user ends voice input.

In one embodiment of the present application, as shown in FIG. 4, the voice dialogue processing apparatus 300 based on a multi-modal feature further comprises a first processing module 306.

The first processing module 306 is used for determining, in the case of determining that the user ends the voice input, first reply voice information corresponding to the first voice information, and outputting the first reply voice information.

In one embodiment of the present application, as shown in FIG. 4, the voice dialogue processing apparatus 300 based on a multi-modal feature further comprises a third acquisition module 307 and a second processing module 308.

The third acquisition module 307 is used for acquiring, in the case of determining that the user does not end the voice input, second voice information input again by the user.

The second processing module 308 is used for determining, according to the first voice information and the second voice information, corresponding second reply voice information, and outputting the second reply voice information.

The voice dialogue processing apparatus based on a multi-modal feature according to an embodiment of the present application determines, in the process of performing dialogue interaction with a user, by combining text information of voice information currently input by the user and historical context information of the first voice information, semantic feature information of the text information: determines, according to a voice fragment, which is before the silent segment, in the first voice information, phonetic feature information of the first voice information; acquires temporal feature information of the first voice information; and determines, according to the semantic feature information, the phonetic feature information and the temporal feature information, whether the user ends voice input. Therefore, in the process of performing dialogue interaction with the user, the semantic feature information, phonetic feature information and temporal feature information are combined to accurately determine whether the system can take over the right to speak.

According to embodiments of the present application, the present application also provides an electronic device and a readable storage medium.

Figure 5:
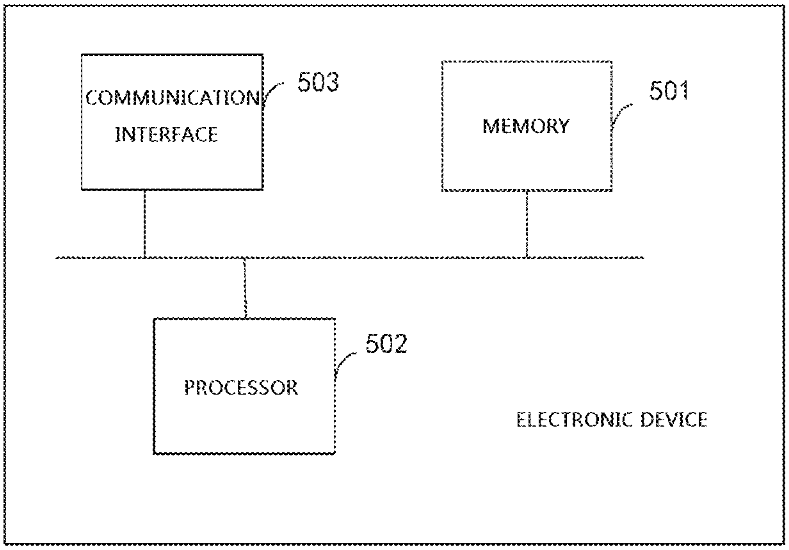
FIG. 5 is a block diagram of an electronic device according to an embodiment of the present application.

FIG. 5 is a block diagram of an electronic device according to an embodiment of the present application.

As shown in FIG. 5, the electronic device comprises a memory 501, a processor 502, and computer instructions stored on the memory 501 and executable on the processor 502.

When executing instructions, the processor 502 implements the voice dialogue processing methods based on a multi-modal feature as provided in the above embodiments.

Further, the electronic device also comprises a communication interface 503 for communication between the memory 501 and the processor 502.

The memory 501 is used for storing computer instructions executable on the processor 502.

The memory 501 may comprise a high-speed RAM memory, or may also comprise a non-volatile memory, such as at least one disk memory.

The processor 502 is used for implementing the voice dialogue processing methods based on a multi-modal feature according to the above embodiments when executing programs.

If the memory 501, the processor 502 and the communication interface 503 are implemented independently, the communication interface 503, the memory 501 and the processor 502 can be connected to each other through a bus and complete communication with each other. The bus may be an Industry Standard Architecture (ISA) bus, a Peripheral Component Interconnect (PCI) bus or an Extended Industry Standard Architecture (EISA) bus, etc. The bus can be divided into an address bus, a data bus, a control bus, etc. For ease of presentation, only one thick line is used to represent the bus in FIG. 5, but it does not mean that there is only one bus or one type of bus.

In some embodiments, if the memory 501, the processor 502 and the communication interface 503 are implemented by integrating them on one chip, the memory 501, the processor 502 and the communication interface 503 can communicate with each other through an internal interface.

The processor 502 may be a Central Processing Unit (CPU), an Application-Specific Integrated Circuit (ASIC), or one or more integrated circuits configured to implement the embodiments of the present application.

The present application also proposes a computer program product, in which instructions, when executed by a processor, implement the voice dialogue processing methods based on a multi-modal feature according to the embodiments of the present application.

In the description of the present Description, referring to the descriptions of the terms "one embodiment", "some embodiments", "an example", "a specific example", "some examples" or the like, they mean that specific features, structures, materials or characteristics described in combination with the embodiment(s) or example(s) are included in at least one embodiment or example of the present application. In the present Description, the schematic expressions of the above terms are not necessarily directed to the same embodiment(s) or example(s). Moreover, the specific features, structures, materials or characteristics described may be combined in a suitable manner in any one or more embodiments or examples. Furthermore, those skilled in the art can combine different embodiments or examples described in the present Description and features thereof unless they are inconsistent with each other.

Besides, the terms "first" and "second" are used for descriptive purposes only and cannot be understood as indicating or implying relative importance or implicitly specifying the quantity of technical features indicated. Therefore, the features defined with "first" and "second" may explicitly or implicitly include at least one of these features. In the description of the present application, "plurality" means at least two, such as two, three, etc., unless otherwise expressly and specifically limited.

Any process or method descriptions in flowcharts or otherwise described herein can be understood to represent modules, segments, or portions of code that include one or more executable instructions for implementing the steps of a customized logical function or process. In addition, the scope of preferred embodiments of the present application includes additional implementations in which functions can be performed out of the order shown or discussed, including in a substantially simultaneous manner or in a reverse order, depending on the functionality involved, which should be understood by those skilled in the technical field to which the embodiments of the present application belong.

The logic and/or steps represented in flowcharts or otherwise described herein, for example, can be considered as a sequenced list of executable instructions for implementing the logical functions, and can be embodied in any computer-readable medium for use by or in combination with an instruction execution system, apparatus, or device (such as a computer-based system, a system comprising a processor, or other systems that can fetch instructions from the instruction execution system, apparatus, or device and execute the instructions). As far as the present Description is concerned, the "computer-readable medium" may be any apparatus that can contain, store, communicate, propagate, or transmit a program for use by or in combination with an instruction execution system, apparatus, or device. More specific examples (non-exhaustive list) of the computer-readable storage medium include: an electrical connection with one or more wires (electronic device), a portable computer disk case (magnetic device), a random access memory (RAM), a read-only memory (ROM), an erasable, programmable read-only memory (EPROM or flash memory), a fiber optic device, and a portable compact disk read-only memory (CDROM). In addition, the computer-readable medium may even be paper or other suitable medium on which a program can be printed, because the program can be obtained electronically, such as by optical scanning of paper or other media followed by editing, interpretation, or other suitable processing if necessary, and then stored in a computer memory.

It should be understood that various parts of the present application can be implemented in hardware, software, firmware, or a combination thereof. In the above embodiments, multiple steps or methods may be implemented with software or firmware stored in a memory and executed by a suitable instruction execution system. For example, if they are implemented with hardware, as in another embodiment, they can be implemented by any one of the following technologies known in the art or a combination thereof: a discrete logic circuit with a logic gate circuit for implementing logical functions on data signals, an application-specific integrated circuit with an appropriate combinational logic gate circuit, a programmable gate array (PGA), a field programmable gate array (FPGA), etc.

Those skilled in the art can understand that all or part of the steps involved in implementing the methods of the above embodiments can be completed by instructing relevant hardware through a program. The program can be stored in a computer-readable storage medium, and, when executed, includes one of the steps of the method embodiments or a combination thereof.

Besides, various functional units in various embodiments of the present application can be integrated into a processing module, or each unit can exist physically alone, or two or more units can be integrated into one module. The above integrated module can be implemented in the form of hardware or a software function module. If the integrated module is implemented in the form of a software function module and sold or used as an independent product, it can also be stored in a computer-readable storage medium.

The storage medium mentioned above may be a read-only memory, a magnetic disk, an optical disk or the like. Although the embodiments of the present application have been shown and described above, it can be understood that the above-mentioned embodiments are illustrative and cannot be construed as limitations to the present application. Those skilled in the art can make changes, modifications, substitutions and variations to the above embodiments within the scope of the present application.

The invention claimed is:

1. A voice dialogue processing method based on a multi-modal feature, comprising:
- acquiring, in a process of performing dialogue interaction with a user, first voice information that the user currently inputs, wherein the first voice information comprises a silent segment;
- determining, according to text information of the first voice information and historical context information of the first voice information, semantic feature information of the text information;
- determining, according to a voice fragment, which is before the silent segment, in the first voice information, phonetic feature information of the first voice information;
- acquiring temporal feature information of the first voice information; and
- determining, according to the semantic feature information, the phonetic feature information and the temporal feature information, whether the user ends voice input,
- wherein the determining, according to a voice fragment, which is before the silent segment, in the first voice information, phonetic feature information of the first voice information comprises:
- acquiring a voice fragment of a first preset time length, which is before the silent segment, in the first voice information;
- segmenting, according to a second preset time length, the voice fragment to obtain multiple voice fragments;
- extracting respective acoustic feature information of the multiple voice fragments, and splicing the respective acoustic feature information of the multiple voice fragments, respectively, to obtain respective splicing features of the multiple voice fragments;
- inputting the splicing features into a deep residual network to obtain phonetic feature information of the first voice information.

2. The method according to claim 1, wherein the determining, according to text information of the first voice information and historical context information of the first voice information, semantic feature information of the text information comprises:
- performing voice recognition on the first voice information to obtain text information of the first voice information;
- acquiring historical context information of the first voice information; and
- inputting the text information and the historical context information into a semantic representation model to obtain semantic feature information of the text information.

3. The method according to claim 1, wherein the acquiring temporal feature information of the first voice information comprises:
- acquiring a voice duration, a speaking speed and a text length of the first voice information;
- inputting the voice duration, the speaking speed and the text length into a pre-trained multi-layer perceptron MLP model to obtain temporal feature information of the first voice information.

4. The method according to claim 1, wherein the determining, according to the semantic feature information, the phonetic feature information and the temporal feature information, whether the user ends voice input comprises:
- inputting the semantic feature information, the phonetic feature information and the temporal feature information into a multi-modal fusion model;
- determining, according to an output result of the multi-modal fusion model, whether the user ends voice input.

5. The method according to claim 1, further comprising:
- determining, in the case of determining that the user ends the voice input, first reply voice information corresponding to the first voice information, and outputting the first reply voice information.

6. The method according to claim 1, further comprising:
- acquiring, in the case of determining that the user does not end the voice input, second voice information input again by the user; and
- determining, according to the first voice information and the second voice information, corresponding second reply voice information, and outputting the second reply voice information.

7. An electronic device, comprising: a memory, and a processor, wherein the memory stores computer instructions that, when executed by the processor, implement a voice dialogue processing method based on a multi-modal feature, comprising:
- acquiring, in a process of performing dialogue interaction with a user, first voice information that the user currently inputs, wherein the first voice information comprises a silent segment;
- determining, according to text information of the first voice information and historical context information of the first voice information, semantic feature information of the text information;
- determining, according to a voice fragment, which is before the silent segment, in the first voice information, phonetic feature information of the first voice information;
- acquiring temporal feature information of the first voice information; and
- determining, according to the semantic feature information, the phonetic feature information and the temporal feature information, whether the user ends voice input,
- wherein the determining, according to a voice fragment, which is before the silent segment, in the first voice information, phonetic feature information of the first voice information comprises:

acquiring a voice fragment of a first preset time length, which is before the silent segment, in the first voice information;

segmenting, according to a second preset time length, the voice fragment to obtain multiple voice fragments;

extracting respective acoustic feature information of the multiple voice fragments, and splicing the respective acoustic feature information of the multiple voice fragments, respectively, to obtain respective splicing features of the multiple voice fragments;

inputting the splicing features into a deep residual network to obtain phonetic feature information of the first voice information.

8. The electronic device according to claim 7, wherein the determining, according to text information of the first voice information and historical context information of the first voice information, semantic feature information of the text information comprises:

performing voice recognition on the first voice information to obtain text information of the first voice information;

acquiring historical context information of the first voice information; and inputting the text information and the historical context information into a semantic representation model to obtain semantic feature information of the text information.

9. The electronic device according to claim 7, wherein the acquiring temporal feature information of the first voice information comprises:

acquiring a voice duration, a speaking speed and a text length of the first voice information;

inputting the voice duration, the speaking speed and the text length into a pre-trained multi-layer perceptron MLP model to obtain temporal feature information of the first voice information.

10. The electronic device according to claim 7, wherein the determining, according to the semantic feature information, the phonetic feature information and the temporal feature information, whether the user ends voice input comprises:

inputting the semantic feature information, the phonetic feature information and the temporal feature information into a multi-modal fusion model;

determining, according to an output result of the multi-modal fusion model, whether the user ends voice input.

11. The electronic device according to claim 7, wherein, when executed by the processor, the computer instructions further implements the voice dialogue processing method including:

determining, in the case of determining that the user ends the voice input, first reply voice information corresponding to the first voice information, and outputting the first reply voice information.

12. The electronic device according to claim 7, wherein, when executed by the processor, the computer instructions further implements the voice dialogue processing method including:

acquiring, in the case of determining that the user does not end the voice input, second voice information input again by the user; and determining, according to the first voice information and the second voice information, corresponding second reply voice information, and outputting the second reply voice information.

13. A non-transitory computer-readable storage medium storing computer instructions, wherein the computer instructions are used to cause the computer to perform a voice dialogue processing method based on a multi-modal feature, comprising:

acquiring, in a process of performing dialogue interaction with a user, first voice information that the user currently inputs, wherein the first voice information comprises a silent segment;

determining, according to text information of the first voice information and historical context information of the first voice information, semantic feature information of the text information;

determining, according to a voice fragment, which is before the silent segment, in the first voice information, phonetic feature information of the first voice information;

acquiring temporal feature information of the first voice information; and determining, according to the semantic feature information, the phonetic feature information and the temporal feature information, whether the user ends voice input, wherein the determining, according to a voice fragment, which is before the silent segment, in the first voice information, phonetic feature information of the first voice information comprises:

acquiring a voice fragment of a first preset time length, which is before the silent segment, in the first voice information;

segmenting, according to a second preset time length, the voice fragment to obtain multiple voice fragments;

extracting respective acoustic feature information of the multiple voice fragments, and splicing the respective acoustic feature information of the multiple voice fragments, respectively, to obtain respective splicing features of the multiple voice fragments;

inputting the splicing features into a deep residual network to obtain phonetic feature information of the first voice information.

* * * * *